United States Patent
Saitou et al.

(10) Patent No.: US 7,533,941 B2
(45) Date of Patent: May 19, 2009

(54) SEAT PAD FOR VEHICLE

(75) Inventors: Tomokazu Saitou, Kodaira (JP); Kazushige Ebe, Findlay, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 11/783,352

(22) Filed: Apr. 9, 2007

(65) Prior Publication Data

US 2007/0241604 A1    Oct. 18, 2007

Related U.S. Application Data (63) Continuation of application No. PCT/JP2006/315466, filed on Aug. 4, 2006.

(30) Foreign Application Priority Data

| Aug. 18, 2005 | (JP) | ............................. 2005-237874 |
| Aug. 25, 2005 | (JP) | ............................. 2005-244521 |
| Apr. 7, 2006  | (JP) | ............................. 2006-106504 |

(51) Int. Cl.
    *A47C 7/18* (2006.01)
(52) U.S. Cl. ............................. 297/452.55; 297/452.27; 297/452.46
(58) Field of Classification Search ............ 297/452.26, 297/452.57, 452.55, 452.24, 452.42, 452.47, 297/452.46, 180.1, 452.27
    See application file for complete search history.

(56) References Cited

U.S. PATENT DOCUMENTS

| 3,323,152 | A | * | 6/1967 | Lerman ....................... 5/655.9 |
| 3,736,022 | A | * | 5/1973 | Radke .................... 297/452.43 |
| 4,571,763 | A | * | 2/1986 | Suzuyama et al. .............. 5/653 |
| 4,577,907 | A | * | 3/1986 | Talmon et al. ......... 297/452.12 |
| 4,699,427 | A | * | 10/1987 | Kobayashi ............. 297/452.62 |
| 5,226,188 | A | * | 7/1993 | Liou ............................. 5/653 |
| 5,722,729 | A | * | 3/1998 | Carilli ................... 297/452.55 |
| 6,626,488 | B2 |  | 9/2003 | Pfahler |
| 7,108,319 | B2 | * | 9/2006 | Hartwich et al. ......... 297/180.1 |

FOREIGN PATENT DOCUMENTS

| CN | 2431158 Y | 5/2001 |
| CN | 1535220 A | 10/2004 |
| JP | 11-34710 A | 2/1999 |
| JP | 2002-17510 A | 1/2002 |
| JP | 2004-255208 A | 9/2004 |
| JP | 2005-59646 A | 3/2005 |

OTHER PUBLICATIONS

CN Office Action, Application No. 2006800015087, Feb. 20, 2009.

* cited by examiner

*Primary Examiner*—Milton Nelson, Jr.
(74) *Attorney, Agent, or Firm*—Sughrue Mion, PLLC (57) ABSTRACT

Seating comfort is improved in a seat pad for vehicles includes a pad main body having a bottom dented upward to form a concave portion and having an insert arranged in the concave portion. The seat pad for vehicles 10 includes a cushion pad. The cushion pad includes a pad main body 20, an insert 30, and a rigid layer 40. The pad main body 20 has a concave portion 24. The insert 30 fits in the concave portion 24. The rigid layer 40 is bonded with the ceiling plane of the concave portion 24. The insert 30 has many protrusions 31 on its top face, and gaps between the protrusions 31 constitute a space 32. The space 32 communicates with a seating plane through holes 27 and communicates with the seating plane of the insert 30 through a through hole 33.

14 Claims, 8 Drawing Sheets

SEAT PAD FOR VEHICLE

CROSS REFERENCE TO RELATED APPLICATION

This is a continuation application of PCT/JP2006/315466 filed on Aug. 4, 2006.

FIELD OF THE INVENTION

The present invention relates to seat pads for vehicles. More specifically, it relates to seat pads for vehicles each including a pad main body having a bottom dented upward to form a concave portion, and an insert arranged in the concave portion. It also relates to seat pads for vehicles having a device for improving the seat comfort.

BACKGROUND OF THE INVENTION

Japanese Unexamined Patent Application Publications No. 11-34710 and No. 2005-59646 each disclose a seat with a seating sensor which includes a pad main body having a concave portion in its bottom dented upward, a slab placed in the concave portion, and a sensor arranged on a top face of the slab.

Japanese Unexamined Patent Application Publication No. 2004-255208 mentions a seat cushion including a pan frame and a seat cushion pad made of a polyurethane foam and arranged on the pan frame, in which the pan frame includes holes below an ischium-contact section so as to yield a soft seating feel in the vicinity of the ischium-contact section.

Patent Document 1: Japanese Unexamined Patent Application Publication No. 11-34710

Patent Document 2: Japanese Unexamined Patent Application Publication No. 2005-59646

Patent Document 3: Japanese Unexamined Patent Application Publication No. 2004-255208

SUMMARY OF THE INVENTION

A first object of the present invention is to improve seating comfort in a seat pad for vehicles which includes a pad main body having a bottom dented upward to form a concave portion, and an insert arranged in the concave portion.

A second object of the present invention is to provide a seat pad for vehicles that can improve the seating comfort without using a pan frame with holes having a special shape.

A third object of the present invention is to improve, for example, vibration absorptivity and seat comfort of a seat pad for vehicles which includes a pad main body having a bottom dented upward to form a concave portion, and an insert arranged in the concave portion.

According to a first aspect, there is provided a seat pad for vehicles, which includes a pad main body having a bottom dented upward to form a concave portion, and an insert arranged in the concave portion, in which the seat pad further includes a space between a ceiling plane of the concave portion and a top face of the insert; a rigid layer arranged along the ceiling plane of the concave portion; and at least one hole penetrating the pad main body and the rigid layer so as to communicate the space to a seating face of the pad main body.

According to a second aspect, there is provided a seat pad for vehicles which includes a pad main body having a concave portion in a seating face or a backside opposite to the seating face, and an insert placed in the concave portion, in which the seat pad further includes a rigid layer on at least part of an interface between the concave portion and the insert, the rigid layer configured to control a deflection upon seating.

According to a third aspect, there is provided a seat pad for vehicles which includes a pad main body having a bottom dented upward to form a concave portion, and an insert arranged in the concave portion, in which the seat pad further includes a gas low-permeable layer having a low gas permeability at an interface between the concave portion and the insert.

DETAILED DESCRIPTION OF THE INVENTION

A seat pad for vehicles according to the first aspect includes a pad main body having a bottom dented upward to form a concave portion, an insert arranged in the concave portion, a space between a ceiling plane of the concave portion and a top face of the insert. The space is communicated through a hole to a seating face. Thus, air in the space smoothly flows out of the seat pad and the seat pad decreases in its volume upon seating. One can sit on the seat with soft seating feel and good seating comfort.

Further satisfactory seating comfort may be obtained by arranging the space below an under-under-buttocks section.

When the insert has a multiplicity of protrusions on its top face to constitute the space, the entire space between the top face of the insert and the ceiling face of the concave portion communicate with each other. This enables easy air feeding to and easy air discharging from the entire space. Even when part of the space is compressed as a result of seating, the remainder of the space contributes to sufficient ventilation. When heating or cooling is carried out by feeding a warm air or cold air from the bottom of the seat through the space to the top face of the seat, the warm air or cold air can be sufficiently circulated even during seating.

It is also acceptable that the seat pad further includes grooves on the top face of the insert, and inner gaps inside the grooves constitute the space. In this case, operation and advantages as in a seat pad having a multiplicity of protrusions can be obtained by communicating the grooves with each other. The grooves may extend in a longitudinal direction or a crosswise direction for good seating comfort. The ventilation effect is not prevented by communicating the grooves with each other. A face of the insert having grooves has relatively low rigidity. Accordingly, the insert preferably has a relatively rigid side so as to fit in the pad main body satisfactorily. The resulting insert, when inserted into the pad main body, can be satisfactorily held by the pad main body and becomes resistant to falling off.

Air can be more smoothly fed to and discharged from the space by arranging a plurality of the holes.

The space may communicate with the bottom of the seat pad through a communicating section. In this case, warm air or cold air may be fed typically from an air-conditioner to the communicating section. The fed warm air or cold air passes through the holes from the seating face upward to thereby carry out heating or cooling of an occupant.

For more comfortable heating or cooling, the holes are preferably arranged on the left and right sides of the under-buttocks section.

The rigid layer preferably includes a sheet-like article (fabric-like article) impregnated with a resin. The sheet-like article may be arranged in a mold for molding a pad main body. In this case, the sheet-like article is impregnated with a resin for constituting the pad main body, and thus a rigid layer is molded as integrated with the pad main body.

In a seat pad for vehicles according to a second aspect, a rigid layer is arranged at least part of the interface between the concave portion in the pad main body and the insert so as to control the deflection upon seating. The rigid layer may not be arranged in a large-deflection section where the deflection upon seating is to be relatively large but arranged in a small-deflection section where the deflection upon seating is to be relatively small. Such a large-deflection section may be, for example, an under-buttocks section and/or an ischium-contact section. Accordingly, an occupant feels relatively soft in the under-buttocks section and/or the ischium-contact section and feels relatively hard in the other section. The body of the occupant can be more satisfactorily held by the seat.

The rigid layer can be easily molded along with foam molding of a seat pad for vehicles by placing a sheet-like article on an inner wall of a mold, and impregnating the sheet-like article with a resin during foam molding. The sheet-like article includes, for example, a nonwoven fabric, a woven fabric, a hair felt, a victoria lawn, a "Warifu", or a gas-permeable porous resin foam.

In a seat pad for vehicles according to a third aspect, an insert is placed in a concave portion of the bottom of a pad main body, and a gas low-permeable layer is arranged at the interface between the dented portion and the insert. The resulting seat pad for vehicles has an increased rigidity when an occupant sits on the seat pad for vehicles, because the gas low-permeable layer acts to reduce the ventilation of the air from the pad main body to the insert. This improves the absorptivity of vibration and controls vibration properties.

Preferred embodiments of the present invention will be illustrated in further detail below with reference to the attached drawings.

Figure 1:
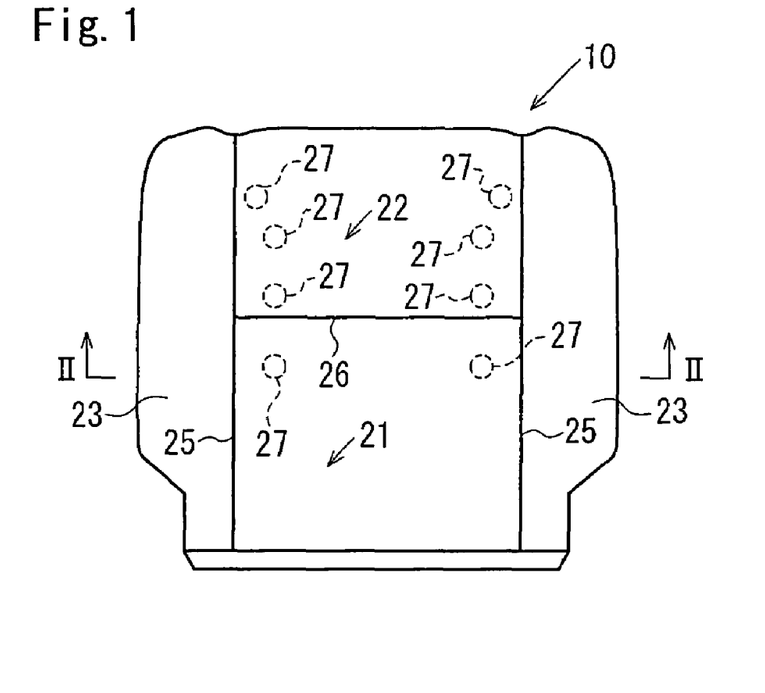
FIG. 1 is a plan view of a seat pad for vehicles according to an embodiment.
Figure 2:
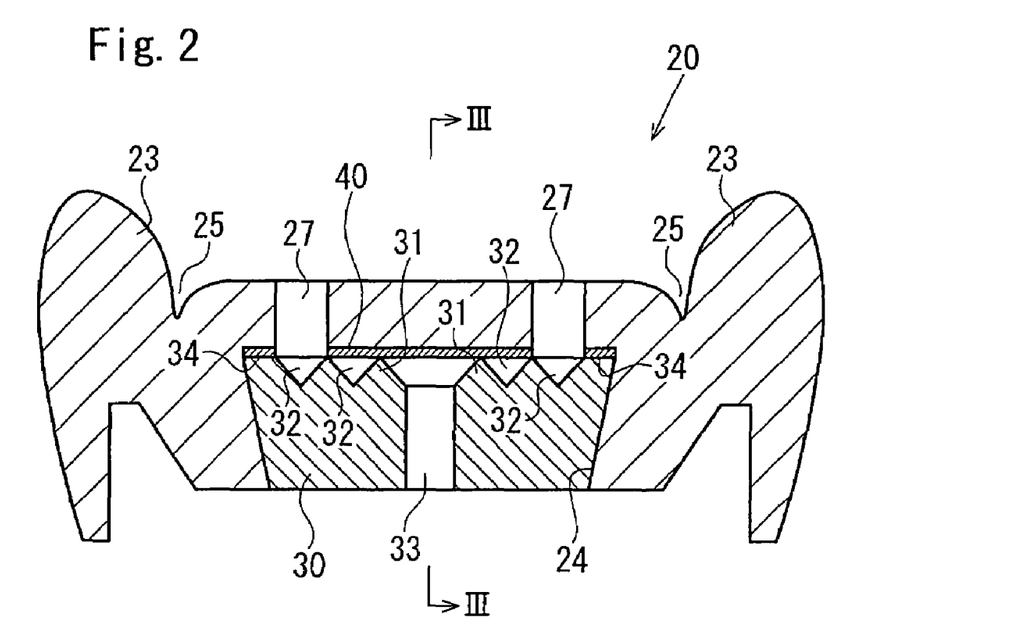
FIG. 2 is a cross sectional view taken along line II-II in FIG. 1.
Figure 3:
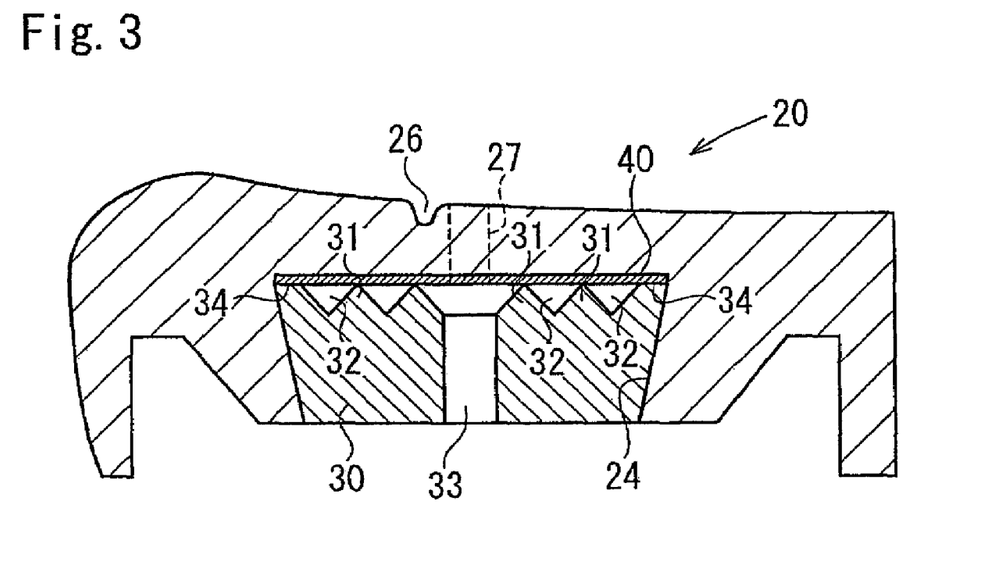
FIG. 3 is a cross sectional view taken along line III-III in FIG. 1.

FIG. 1 is a plan view of a seat pad for vehicles according to an embodiment of the first aspect, and FIGS. 2 and 3 are cross sectional views taken along line II-II and line III-III, respectively, in FIG. 1.

The seat pad for vehicles 10 includes a cushion pad. The cushion pad includes a pad main body 20, an insert 30, and a rigid layer 40. The pad main body 20 has a concave portion 24. The insert 30 fits in the concave portion 24. The rigid layer 40 is arranged along the ceiling plane of the concave portion 24. Holes 27 are arranged so as to penetrate the pad main body 20 and the rigid layer 40. A skin (cover) is attached to the cushion pad to thereby constitute the seat pad for vehicles 10.

The pad main body 20 includes an under-buttocks section 21, an under-thigh section 22, side sections 23, and the concave portion 24 at the bottom.

The concave portion 24 is positioned below the under-buttocks section and is dented upward from the bottom of the pad main body 20. In this embodiment, the concave portion 24 and the insert 30 each have a rectangular plan shape, but their shapes are not limited thereto.

The pad main body 20 has grooves 25 in a longitudinal direction and grooves 26 in a crosswise direction.

When a seat pad for vehicles should have high cushioning property or when a flexible polyurethane or an analogue thereto having a thickness of 5 mm or more is arranged as a covering member on a seat pad, the pad main body 20 preferably includes a low density material, and the insert 30 preferably includes a high-performance material.

In this case, the pad main body 20 preferably includes a polyurethane foam having a core density of 25 to 50 kg/m$^3$ and a 25% hardness of 15 to 25 kgf in terms of a diameter of 200 mm. The insert 30 preferably includes a polyurethane foam having a core density of 45 to 70 kg/m$^3$ and a 25% hardness of 16 to 30 kgf in terms of a diameter of 200 mm.

In contrast, when a seat pad should have a soft feeling on its surface or should have a good initial seating feeling, the pad main body 20 preferably includes a polyurethane foam having a core density of 40 to 70 kg/m$^3$ and a 25% hardness of 8 to 20 kgf in terms of a diameter of 200 mm, and the insert 30 preferably includes a polyurethane foam having a core density of 25 to 55 kg/m$^3$ and a 25% hardness of 16 to 30 kgf in terms of a diameter of 200 mm.

The concave portion 24 and the insert 30 in this seat pad for vehicles may each have a length in a longitudinal direction of preferably 150 to 500 mm and more preferably 200 to 400 mm. The concave portion 24 may have a depth of preferably 30% to 90%, and more preferably 60% to 80% of the thickness of the seat pad 20 in the under-buttocks section.

According to this embodiment, the insert 30 and the concave portion 24 have reversed tapered shapes reducing downward. This enables the insert 30 to be tightly held in the concave portion 24. The insert 30 may be bonded with an inner wall of the concave portion 24 or fixed thereto with an appropriate fastener.

According to this embodiment, the concave portion 24 in the pad main body 20 has a flat ceiling plane. The holes 27 are arranged on the left and right sides of the under-buttocks section of the pad main body 20. Plural holes 27 are arranged on the left and right sides of the under-buttocks section, respectively, in this embodiment, but each one hole may be arranged therein.

The holes are indicated by broken lines in FIG. 1, because the seat pad includes a skin (cover) covering the cushion pad. The skin may include a gas-permeable material such as a woven fabric.

The insert 30 has a multiplicity of protrusions 31 on its top face. The protrusions 31 each have a circular conical shape but may have a pyramid shape or a non-conical shape. When the protrusions 31 have conical shapes, they preferably have a base size of about 100 to 3000 mm$^2$ and a height of about 10 to 50 mm.

Gaps between the protrusions constitute a space 32.

The insert 30 has a through hole 33 in a center part thereof. The through hole 33 penetrates the insert 30 in a vertical direction and acts as a communication section. The number of the through hole 33 is one in this embodiment, but the insert 30 can have two or more through holes 33.

An upper circumference 34 of the insert 30 is a flat plane flash with the upper ends of the protrusions 31. The insert 30 fits in the concave portion 24 so that the upper ends of the protrusions 31 are in contact with the ceiling plane of the concave portion 24. When the insert 30 is placed in the concave portion 24, the space 32 communicates with both the holes 27 and the through hole 33.

When a rigid layer is prepared by placing a gas-permeable material such as a nonwoven fabric on an inner wall of a mold and impregnating the material with a resin during molding, the resulting product may be free from defects such as air bubbles, because a gas formed as a result of foaming is discharged through the gas-permeable material.

The rigid layer 40 in this embodiment has been prepared by placing a sheet-like article such as a fabric sheet-like article in a mold for molding the pad main body 20, and impregnating the sheet-like article with a urethane resin during the molding of the pad main body 20. Thus, the rigid layer 40 is integrated with the pad main body 20. The sheet-like article for constituting the rigid layer 40 can be, for example, a fabric-like article such as a nonwoven fabric or a woven fabric, a hair felt, a victoria lawn, a "Warifu", or a gas-permeable porous resin foam such as a slab urethane.

A rigid plate or sheet independently prepared typically from a synthetic resin or a pressed felt can be used instead of a sheet-like article in the present invention. This may be bonded with at least one of the insert 30 and the ceiling plate of the concave portion 24 or may be placed between them without bonding.

When an occupant sits on the seat pad for vehicles 10 having this configuration, the protrusions 31 are pressed and deformed so as to yield a soft seating feel. In this connection, the rigid layer 40 acts to prevent the occupant from feeling the protrusions 31 and to yield a good seating feel. The rigid layer 40 also acts to prevent the protrusions 31 from partially and locally being pressed.

In this embodiment, the space 32 communicates with the outside via the holes 27 and through hole 33. Thus, air can be smoothly fed to and discharged from the space 32 when an occupant sits on and leaves from the seat.

The rigid layer 40 covers the entire ceiling plane of the concave portion 24, except for the holes 27 in this embodiment. Accordingly, the air enters and leaves the space 32 only through the holes 27 and does not permeate the polyurethane foam in the pad main body 20. This can improve the vibration absorptivity.

The through hole 33 communicates with the holes 27 via the space 32 in this embodiment. When warm air or cold air is fed typically from an air conditioner (not shown) to the through hole 33, the warm air or cold air is discharged upward from the holes 27 so as to carry out heating or cooling of an occupant.

According to this embodiment, the protrusions 31 are arranged substantially overall the top face of the insert 30, except for the circumference 34, and the space 32 communicates with itself in the substantially entire top face of the insert 30. Accordingly, warm air or cold air can be smoothly fed from the through hole 33 to the holes 27 even when part of the space is compressed by a load applied by an occupant.

The protrusions 31 are arranged on the top face of the insert 30 in the embodiment shown in FIGS. 1 to 3. It is also acceptable that plural grooves extending in a longitudinal direction or a crosswise direction are arranged on the top face of the insert 30, and inner spaces inside the grooves constitute the space. In this case, the grooves are preferably configured to communicate with each other.

Next, embodiments according to the second aspect will be illustrated below with reference to FIGS. 4A to 11.

Figure 4A:
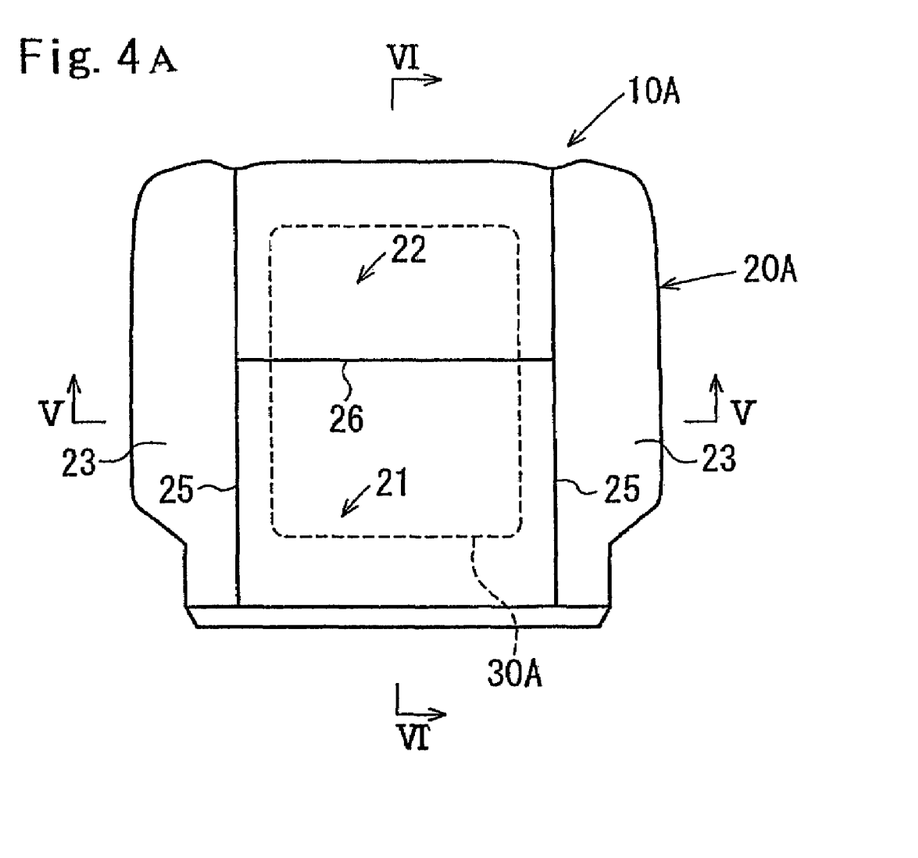
FIG. 4A is a plan view of another embodiment.
Figure 4B:
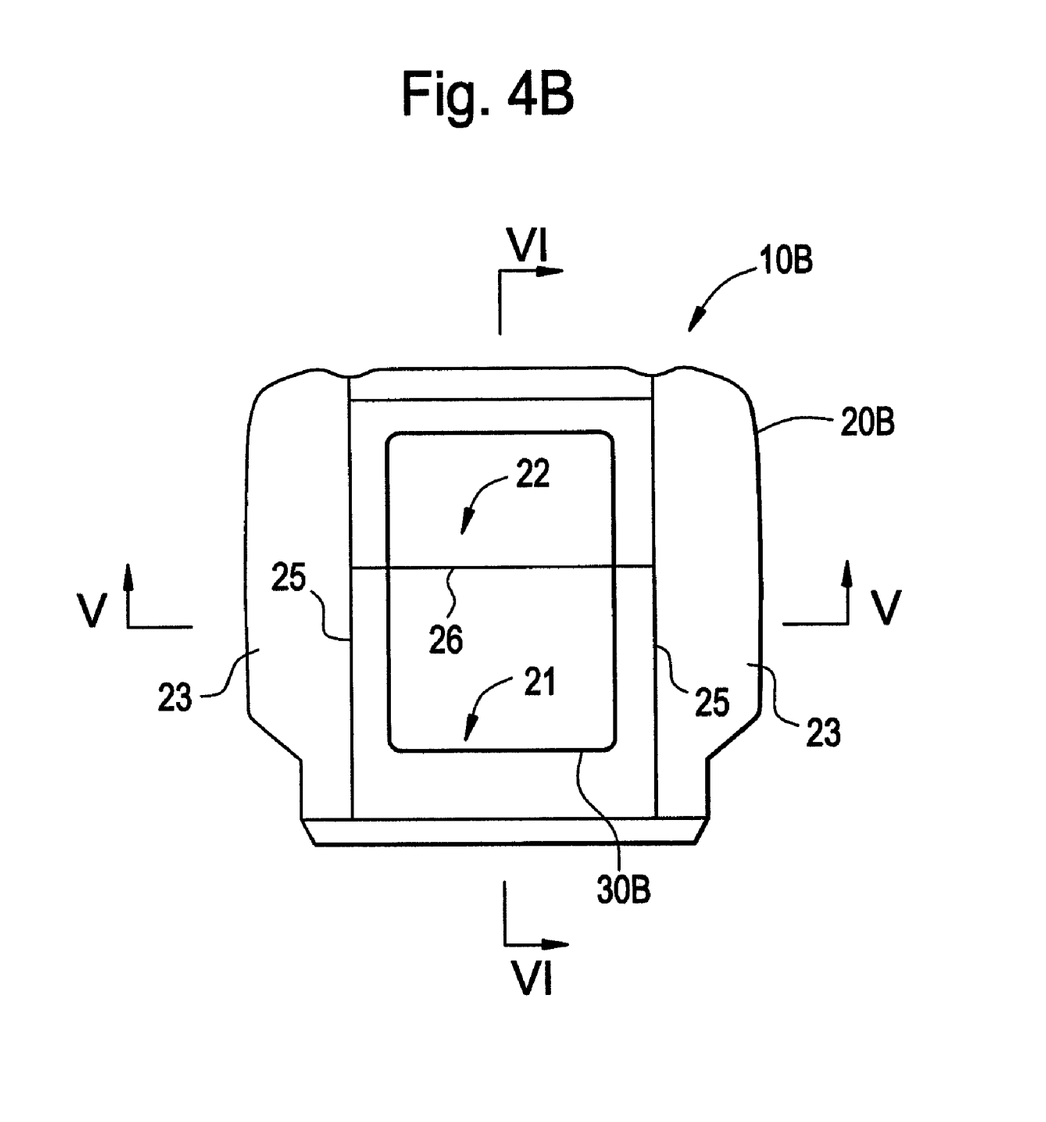
FIG. 4B is a plan view of still another embodiment.
Figure 5A:
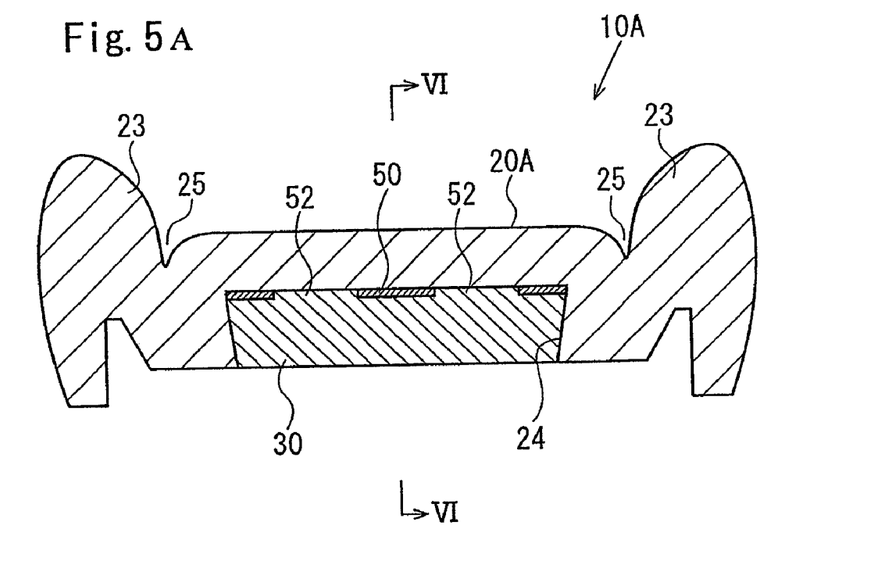
FIG. 5A is a cross sectional view taken along line V-V in FIG. 4A.
Figure 5B:
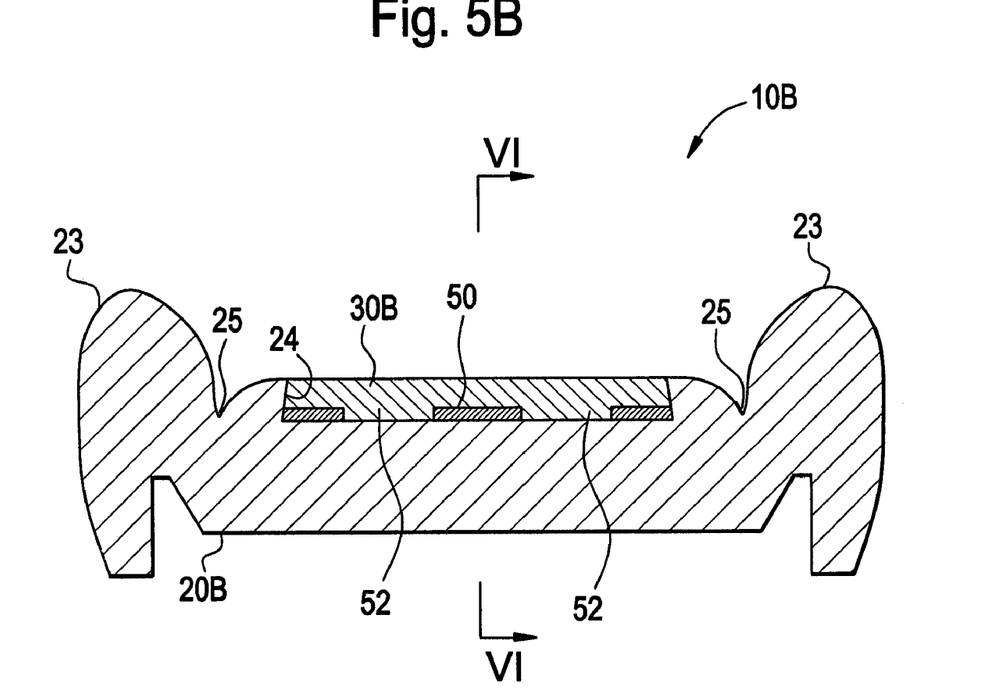
FIG. 5B is a cross sectional view taken along line V-V in FIG. 4B.
Figure 6A:
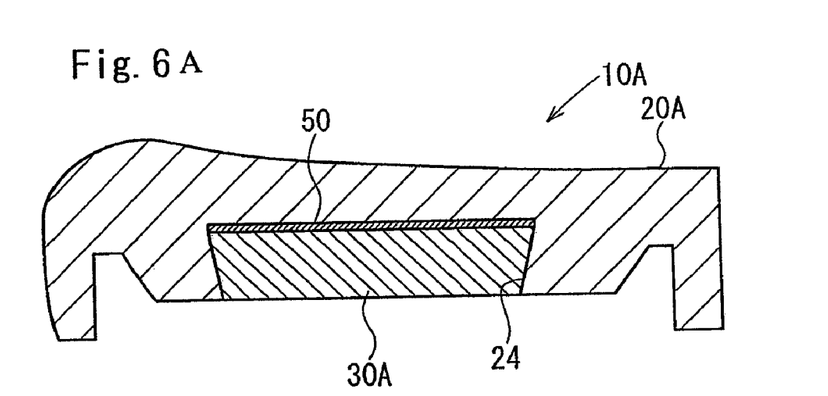
FIG. 6A is a cross sectional view taken along line VI-VI in FIG. 4A.
Figure 6B:
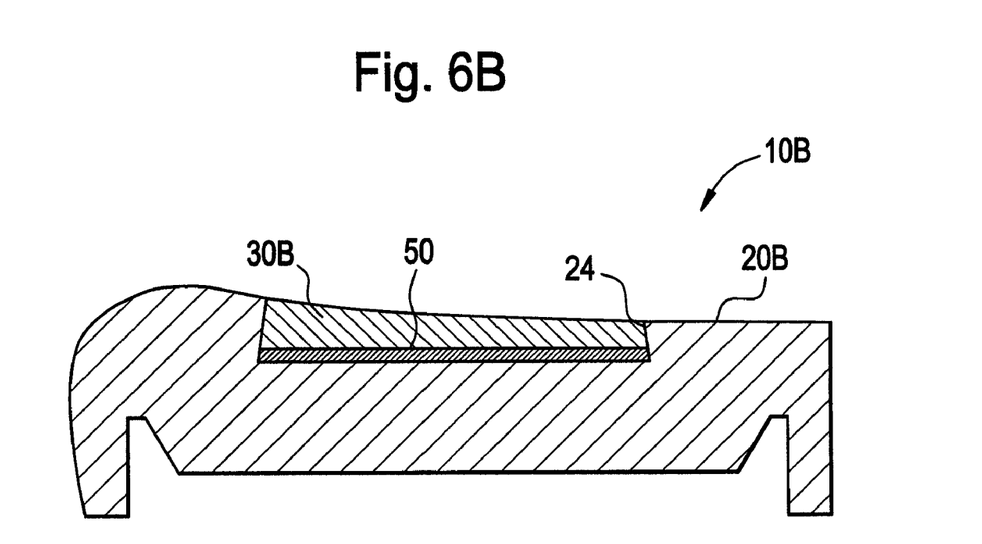
FIG. 6B is a cross sectional view taken along line VI-VI in FIG. 4B.
Figure 7:
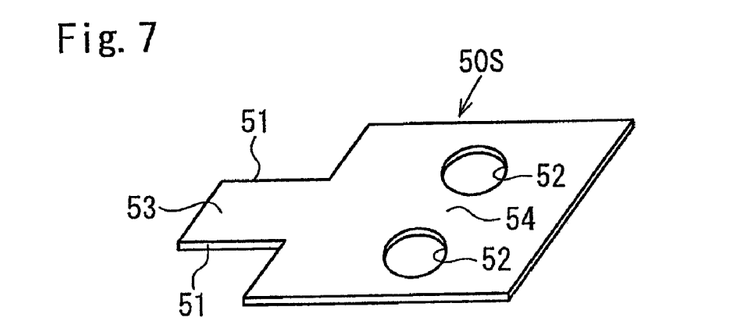
FIG. 7 is a perspective view of a sheet-like article.
Figure 8:
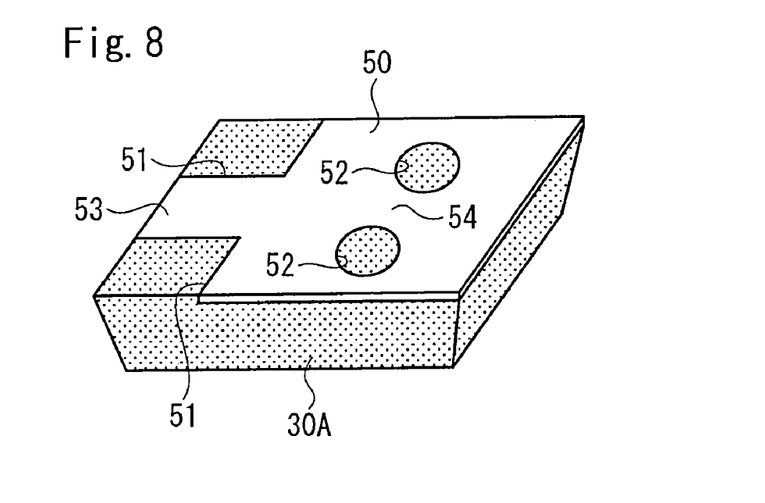
FIG. 8 is a perspective view of an insert for use in yet another embodiment.

FIG. 4A and 4B are plan views of a seat pad for vehicles according to embodiments of the second aspect; FIGS. 5A and 6B are cross sectional views taken along line V-V and line VI-VI in FIG. 4B; FIG. 7 is a perspective view of a sheet-like article; and FIG. 8 is a perspective view of an insert for use in another embodiment than the embodiments shown in FIGS. 4A to 7.

The seat pad for vehicles 10A, 10B includes a cushion pad. The cushion pad includes a pad main body 20A, 20B an insert 30A, 30B and a rigid layer 50. The pad main body 20A, 20B has a concave portion 24, and the insert 30A, 30B fits in the concave portion 24. The rigid layer 50 is arranged along the ceiling pane of the concave portion 24. The cushion pad is covered with a skin (cover) to constitute the seat pad for vehicles 10A, 10B.

The pad main body 20A includes an under-buttocks section 21, an under-thigh section 22, side sections 23, and the concave portion 24 at the bottom, as in the pad main body 20. The pad main body 20B includes an under-buttocks section 21, an under-thigh section 22, side sections 23, and the concave portion 24 at the top.

With respect to the for vehicles 10A, the concave portion 24 is positioned below the under-buttocks section and is dented upward from the bottom of the pad main body 20A. With respect to the seat pad for vehicles 10B, the concave potion 24 is positioned below the under-buttocks section and is dented downward from the top of the pad main body 20B. In these embodiments the concave portion 24 and the insert 30 each have a rectangular plan shape, but their shapes are not limited thereto.

The pad main body 20 has grooves 25 in a longitudinal direction and grooves 26 in a crosswise direction.

Preferred materials for constituting the pad main body 20A and the insert 30A of this seat pad for vehicles are as with the pad main body 20 and the insert 30, respectively. Preferred dimensions in a longitudinal directions of the concave portion 24 and the insert 30A are also as with the pad main body 20 and the insert 30, respectively.

According to this embodiment, the insert 30A and the concave portion 24 have reversed tapered shapes reducing downward. This enables the insert 30A to be tightly held in the concave portion 24. The insert 30A may be bonded with an inner wall of the concave portion 24 or fixed thereto with an appropriate fastener.

According to this embodiment, the concave portion 24 of the pad main body 20A, and the insert 30A have a flat ceiling plane and a flat top face, respectively. The holes 27 are not arranged in this embodiment.

The insert 30A does not have a through hole 33 penetrating vertically.

The rigid layer 50 in this embodiment is integrated with the pad main body 20A. It has been prepared by placing a sheet-like article 50S, such as a fabric sheet-like article as shown in FIG. 7, in a mold for molding the pad main body 20A, and impregnating the sheet-like article with a urethane resin during the molding of the pad main body 20A. The sheet-like article for constituting the rigid layer 50 can be, for example, a fabric-like article such as a nonwoven fabric or a woven fabric, a hair felt, a victoria lawn, a "Warifu", or a gas-permeable porous resin foam such as a slab urethane.

The rigid layer 50 may be arranged not on the ceiling plane of the concave portion 24 but on the top face of the insert 30A (FIG. 8). The rigid layer 50 in FIG. 8 may be prepared by placing a sheet-like article 50S in a mold for molding an insert 30A, impregnating the sheet-like article with a urethane resin during the molding of the insert 30A to thereby form the rigid layer 50 integrated with the insert 30A.

The sheet-like article 50S is the sheet-like article shown in FIG. 7 in these embodiments shown in FIG. 4A to 6B and FIG. 8, respectively. The sheet-like article 50S has notches 51 and 51 on the left and right sides in the front side of the vehicle. This means that the rigid layer 50 is not arranged below the under-thigh sections. The sheet-like article 50S also has circular openings 52 and 52 below the ischium-contact sections (slightly backward from the center in a longitudinal direction and both sides of the center in a crosswise direction). This means that the rigid layer 50 is not arranged below the ischium-contact sections.

The left and right notches 51 each have a width in a crosswise direction of preferably about 70 to about 170 mm and more preferably about 100 to about 130 mm. A tongue section 53 between the notches 51 and 51 preferably has a width in a crosswise direction of about 20 to about 100 mm.

The openings 52 are preferably positioned below regions corresponding to the tuber of ischium of a three-dimensional human phantom according to Japanese Industrial Standards (JIS) D4607. The openings 52 each have a diameter of preferably about 15 to about 80 mm and more preferably about 30 to 60 mm. The shapes of the openings 52 are not limited to circular, and can be, for example, oval or polygonal.

A rigid plate or sheet independently prepared typically of a synthetic resin or a pressed felt can be used instead of a sheet-like article in the present invention. This may be bonded with at least one of the insert 30A and the ceiling plate of the concave portion 24 or may be placed between them without bonding.

When an occupant sits on the seat pad for vehicles 10A having this configuration, the seat pad for vehicles is flexibly compressed and deformed in regions corresponding to the under-thigh sections and the ischium-contact sections to thereby yield a soft, flexible seating feel. In addition, the seat pad has the rigid layer 50 and thereby yields a relatively rigid or hard seating feel in regions other than the under-thigh sections and the ischium-contact sections. Thus, the body of the occupant can be held satisfactorily.

In the embodiments shown in FIGS. 4A to 8, the rigid layer is absent in both regions corresponding to the under-thigh sections and the ischium-contact sections (the notches 51 and openings 52). However, the rigid layer may be absent in either one of these regions, namely, only one of the notches 51 and the openings 52 may be arranged.

Figure 9:
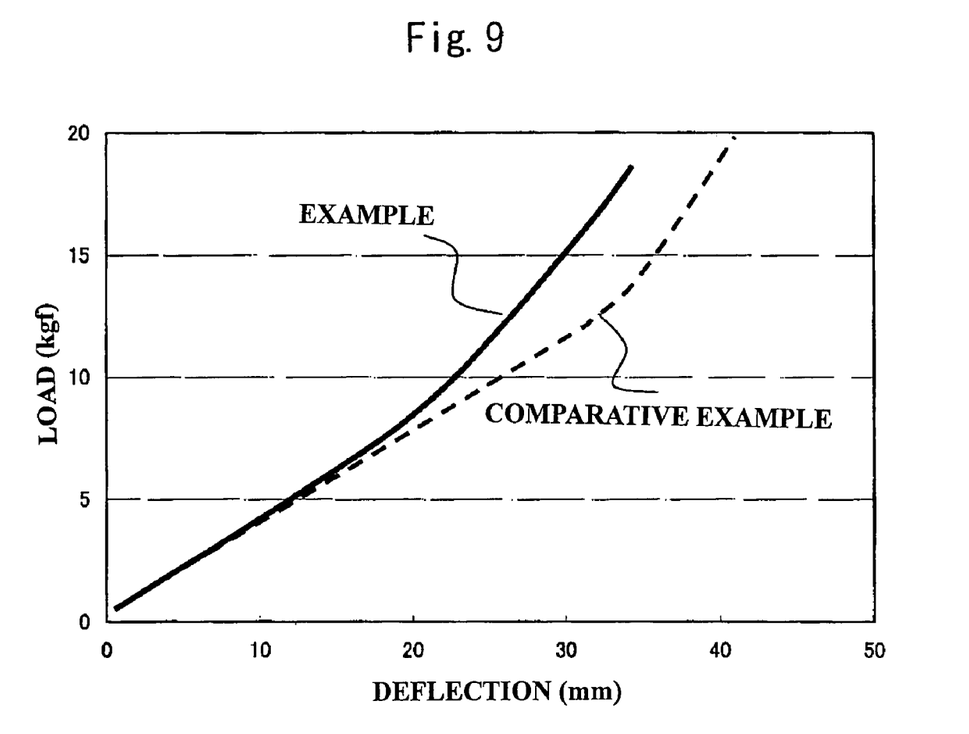
FIG. 9 is a diagram showing characteristics of Example and Comparative Example.
Figure 10:
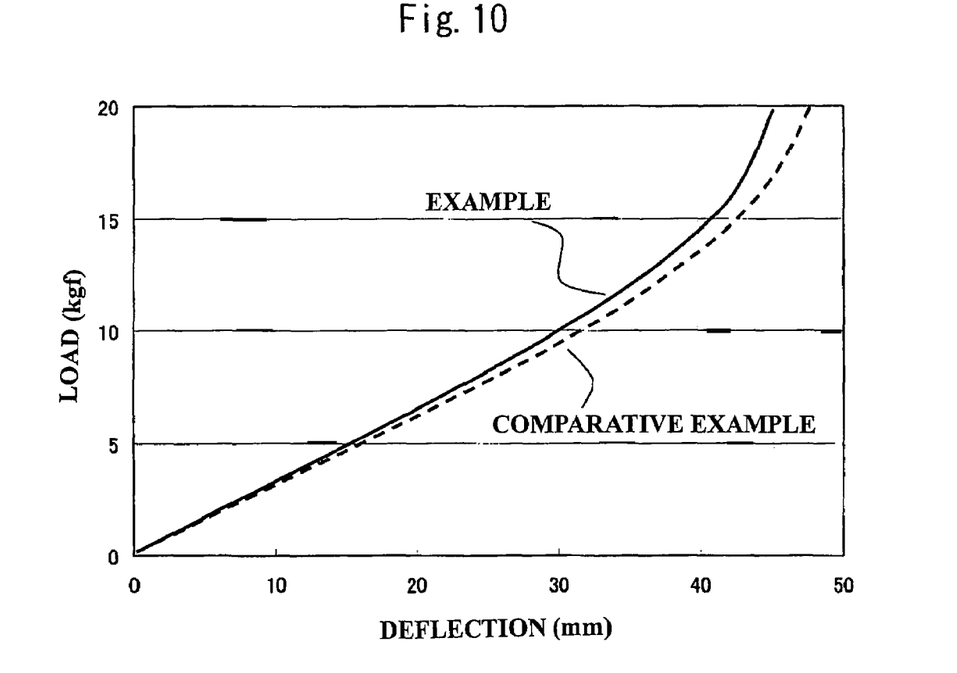
FIG. 10 is a diagram showing characteristics of Example and Comparative Example.

The seat pad for vehicles shown in FIGS. 4A to 8 is preferably configured as follows. Specifically, when the seat pad is pressed with an indenter having a diameter of 80 mm from above the tongue section 53, the difference in load at a deflection of 30 mm is preferably about 1 to about 15 kgf and more preferably about 3 to 8 kgf between a sample having the rigid layer 50 and another sample having no rigid layer 50. In addition, when a section 54 between the left and right openings 52 and 52 is pressed in the same manner, the difference in load at an indentation of 30 mm is preferably about 1 to about 15 kgf between a sample having the rigid layer 50 and another sample having no rigid layer 50. FIGS. 9 and 10 illustrate load-deflection curves by way of example.

The seat pad for vehicles used in the tests is one shown in FIGS. 4A to 7 and is made from a polyurethane foam. The polyurethane foam has a density of 70 kg/m³ both in the main body and in the insert. The seat pad has a total thickness of 60 mm and a thickness of the insert of 15 mm in regions other than the under-thigh sections. It has a pad thickness of 35 mm and a thickness of the insert of 20 mm in the under-thigh sections. The rigid layer is arranged on the ceiling plane of the concave portion and has been prepared by placing a polypropylene nonwoven fabric on an inner wall of a mold. The resulting rigid layer has a thickness of about 1 mm.

In a comparative sample (Comparative Example), the rigid layer is not arranged.

FIG. 9 is a characteristic chart where the region 54 between the openings 52 is pressed with an indenter having a diameter of 80 mm. The difference in load at an indentation of 30 mm is about 4 kgf between a sample (Example) including the rigid layer and the comparative sample (Comparative Example) including no rigid layer. FIG. 10 is a characteristic chart where the tongue section 53 is pressed with the indenter. The difference in load at an indentation of 30 mm is about 1 kgf between a sample (Example) including the rigid layer and a comparative sample (Comparative Example) including no rigid layer.

Figure 11:
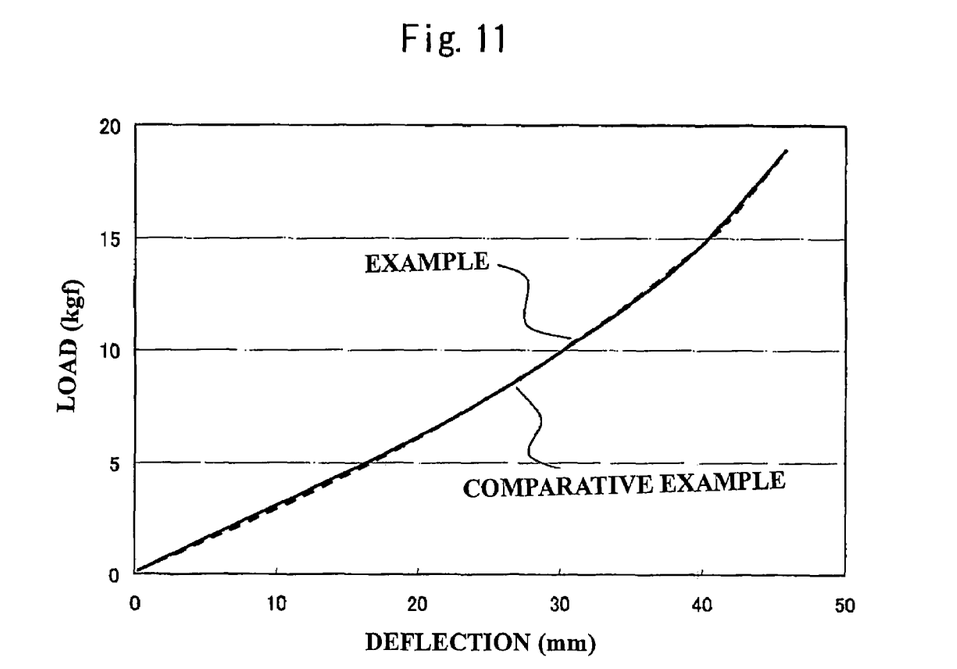
FIG. 11 is a diagram showing characteristics of Example and Comparative Example.

FIG. 11 is a characteristic chart where a region corresponding to the notch 51 is pressed with the indenter. The load-deflection curves in the notch 51 show no or substantially no difference between a comparative sample (Comparative Example) without the rigid layer and a sample (Example) including the rigid layer. This is because, even in the sample including the rigid layer, the rigid layer is not arranged in the notch 51.

The seat pad in the embodiment has one concave portion. However, it may also have two or more concave portions. In addition, two or more independent inserts may be arranged in one concave portion.

The vibration absorption properties of the seat pads according to the present invention can be controlled by adjusting the mass per unit area (METSUKE) and/or density of the rigid layer.

In the above description, a cushion pad is used, but the present invention can also be applied to a back pad.

Figure 12:
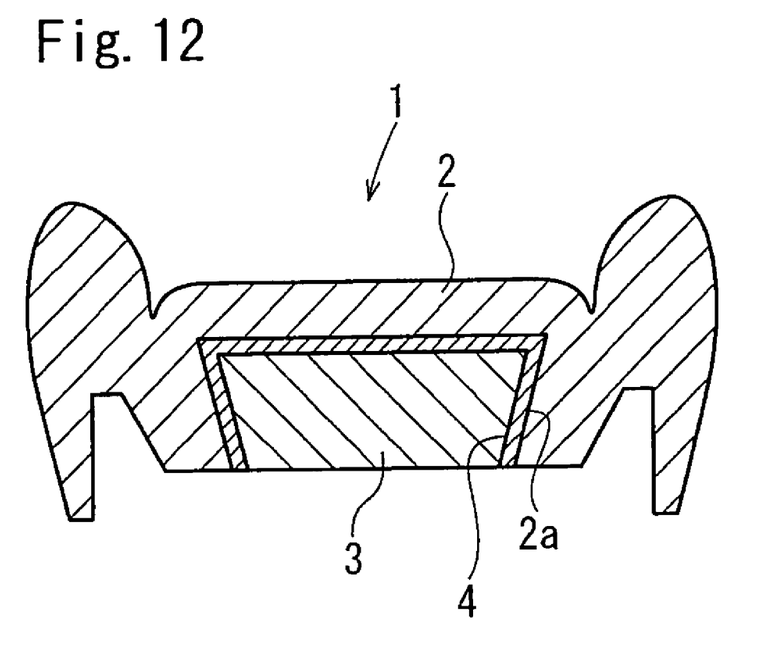
FIG. 12 is a cross sectional view of a seat pad for vehicles according to an embodiment of a third aspect.
Figure 13:
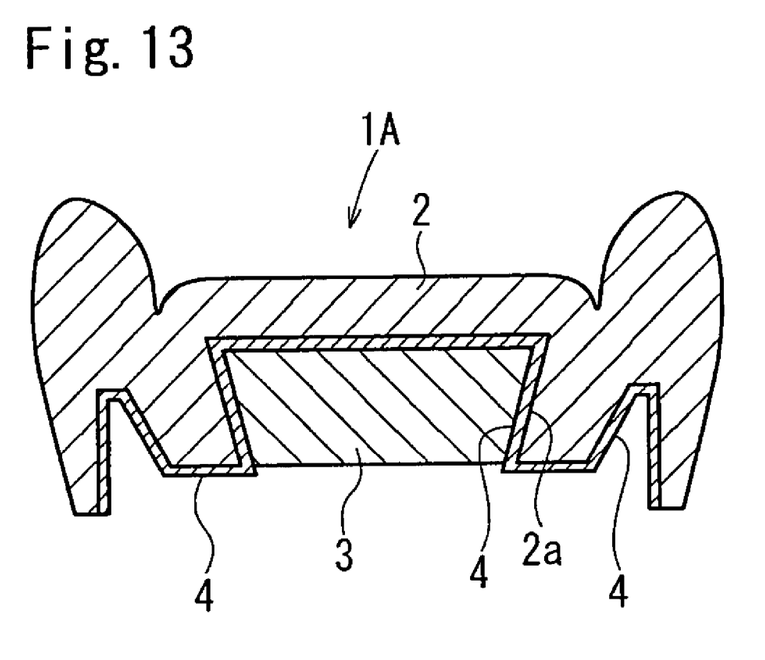
FIG. 13 is a cross sectional view of a seat pad for vehicles according to another embodiment of the third aspect.

FIGS. 12 and 13 are cross sectional views of seat pads for vehicles according to an embodiment and another embodiment, respectively, of the third aspect.

A seat pad for vehicles 1 includes a cushion pad. The cushion pad includes a pad main body 2 and an insert 3. The pad main body 2 has a concave portion 2a, and the insert 3 fits in the concave portion 2a. The cushion pad is covered with a skin (cover) so as to constitute the seat pad for vehicles 1.

The concave portion 2a is dented upward from the bottom of the pad main body 2 at least under the under-buttocks section. In this embodiment, the concave portion 2a and the insert 3 may have any shapes such as rectangular shapes.

When a seat pad for vehicles should have high cushioning property or when a flexible polyurethane or an analogue thereto having a thickness of 5 mm or more is arranged as a covering member on a seat pad, the pad main body 2 preferably includes a low density material, and the insert 3 preferably includes a high-performance material.

In this case, the pad main body 2 preferably includes a polyurethane foam having a core density of 25 to 50 kg/m³ and a 25% hardness of 15 to 25 kgf in terms of a diameter of 200. The insert 3 preferably includes a polyurethane foam having a core density of 45 to 70 kg/m³ and a 25% hardness of 16 to 30 kgf in terms of a diameter of 200.

In contrast, when a seat pad should have a soft feeling on its surface or have a good initial seating feeling, the pad main body 2 preferably includes a polyurethane foam having a core density of 40 to 70 kg/m³ and a 25% hardness of 8 to 20 kgf in terms of a diameter of 200, and the insert 3 preferably includes a polyurethane foam having a core density of 25 to 55 kg/m³ and a 25% hardness of 16 to 30 kgf in terms of a diameter of 200.

The concave portion 2a and the insert 3 in this seat pad for vehicles may each have a length in a longitudinal direction of preferably 150 to 500 mm and more preferably 200 to 400 mm. The concave portion 2a may have a depth of preferably 30% to 90%, and more preferably 60% to 80% of the thickness of the seat pad 1 in the under-buttocks section.

According to this embodiment, the insert 3 and the concave portion 2a have reversed tapered shapes-reducing downward. This enables the insert 3 to be tightly held in the concave portion 2a. The insert 3 may be bonded with an inner wall of the concave portion 2a or fixed thereto with an appropriate fastener.

The seat pad for vehicles 1 shown in FIG. 12 includes a gas low-permeable layer 4 between the top face of the insert 3 and the inner wall of the concave portion 2a. In the seat pad for vehicles 1A in FIG. 13, the gas low-permeable layer 4 further extends as far as the bottom of the pad main body 2.

The gas low-permeable layer 4 acts to prevent the air from moving from the pad main body 2 to the insert 3 when an occupant sits on the seat pad for vehicles 1 or 1A. This layer also acts to prevent the air from moving between the pad main body and the insert when an occupant is vibrated by the action of vibration propagated from the floor, and the pad is deformed.

The seat pads for vehicles 1 and 1A have improved rigidity upon seating and more satisfactorily absorb vibration.

The vibration properties of the seat pads for vehicles can be controlled by adjusting the gas permeability of the gas low-permeable layer 4. In FIG. 12, the gas low-permeable layer is arranged at the entire interface between the insert and the main body. The gas low-permeable layer may also be arranged partially at the interface. It may include different materials from a region to another. This configuration can also control the vibration resistance and the seating comfort.

The gas low-permeable layer 4 can be formed by foaming a supporter member integrally with at least one of the pad main body 2 and the insert 3. The supporter member includes, but is not limited to, a nonwoven fabric, a "Warifu", a victoria lawn, hair felt, or a slab urethane having a thickness of about 0.1 to about 5 mm and preferably about 0.5 to about 2 mm.

Instead of the supporter member, a pressed felt having a thickness of about 1 to 5 mm may be arranged in at least one of the pad main body 2 and the insert. Such a pressed felt may be arranged by integral foaming or adhesive bonding. When a supporter member or a pressed felt is integrally foamed, the supporter member or pressed felt is impregnated with a resin component such as a urethane so as to have a reduced gas permeability and an increased rigidity.

A gas low-permeable layer may be formed by arranging a pressed felt or a synthetic resin film having a thickness of about 0.1 to 2 mm between the pad main body 2 and the insert 3.

In the seat pad 1A for vehicles in FIG. 13, an integrally foamed supporter member is arranged overall the bottom of the pad main body 2 so as to prevent frictional noise. This reduces the production cost of the seat.

A gas low-permeable layer may also be arranged at the bottom of the pad main body using another material than a supporter member. A gas low-permeable layer may be arranged partially at the bottom of the pad main body.

While specific embodiments have been described, it should be understood by those skilled in the art that various modifications and alterations may occur depending as far as they do not depart from the scope and spirit of the present invention.

The present application is based on subject matter related to Japanese Patent Application (Japanese Patent Application No. 2005-237874) filed on Aug. 18, 2005, Japanese Patent Application (Japanese Patent Application No. 2005-244521) filed on Aug. 25, 2005, and Japanese Patent Application (Japanese Patent Application No. 2006-106504) filed on Apr. 7, 2006, the entire contents of which are incorporated herein by reference.

The invention claimed is:

1. A seat pad for vehicles, comprising:
    a pad main body having a bottom dented upward to form a concave portion; and
    an insert arranged in the concave portion,
    wherein the seat pad further includes:
    a space between a ceiling plane of the concave portion and a top face of the insert;
    a rigid layer arranged along the ceiling plane of the concave portion; and
    at least one hole penetrating the pad main body and the rigid layer so as to communicate the space to a seating face of the pad main body.

2. The seat pad for vehicles according to claim 1, wherein the insert has a multiplicity of protrusions on its top face, and wherein gaps between the protrusions constitute the space.

3. The seat pad for vehicles according to claim 1,
    wherein the insert has a plurality of grooves, and
    wherein inner spaces in the grooves constitute the space.

4. The seat pad for vehicles according to claim 3, wherein the grooves extend in a longitudinal direction or a crosswise direction.

5. The seat pad for vehicles according to claim 1, wherein the seat pad comprises a plurality of the holes.

6. The seat pad for vehicles according to claim 1, further comprising a communication part configured to communicate the space to the bottom of the seat pad for vehicles.

7. The seat pad for vehicles according to claim 6, wherein the communication part penetrates the insert.

8. The seat pad for vehicles according to claim 1, wherein the space is arranged below an under-buttocks section.

9. The seat pad for vehicles according to claim 8, wherein holes are arranged on the left and right sides of the under-buttocks section.

10. The seat pad for vehicles according to claim 1, wherein the rigid layer comprises an article impregnated with a resin.

11. A seat pad for vehicles comprising a pad main body having a concave portion in one of a seating face and a backside opposite to the seating face, and an insert arranged in the concave portion,
    wherein the seat pad further includes a rigid layer on at least part of an interface between the concave portion and the insert, the rigid layer configured to control a deflection upon seating, and
    wherein the seat pad for vehicles comprises a resin foam, wherein the rigid layer includes an article impregnated with a resin constituting the resin foam, and wherein the impregnation with the resin is carried out simultaneously with the foaming of the resin.

12. The seat pad for vehicles according to claim 11, wherein the article comprises a nonwoven fabric, a woven fabric, a hair felt, a victoria lawn, a "Warifu", or a gas-permeable porous resin foam.

13. The seat pad for vehicles according to claim 11, wherein the rigid layer is integrated with the pad main body.

14. The seat pad for vehicles according to claim 11, wherein the rigid layer is integrated with the insert.

* * * * *